Figure 1:
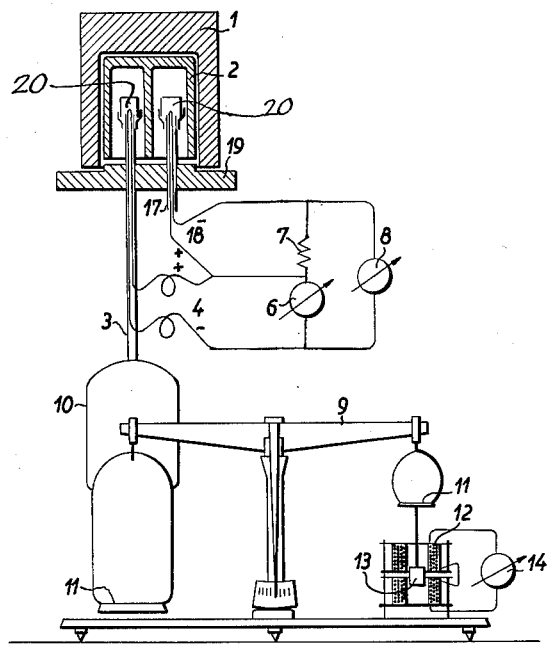

July 24, 1962

F. PAULIK ET AL 3,045,472

APPARATUS FOR SIMULTANEOUSLY CARRYING OUT
THERMOGRAVIMETRIC, DIFFERENTIAL-THERMAL
AND DERIVATIVE-THERMO-GRAVIMETRIC
ANALYSIS

Filed Dec. 3, 1957

2 Sheets-Sheet 1

INVENTORS
FERENC PAULIK
JENO PAULIK
LASZLO ERDEY
BY Irwin S. Thompson
ATTY.

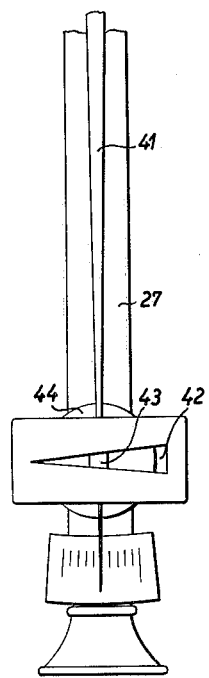
Fig. 3
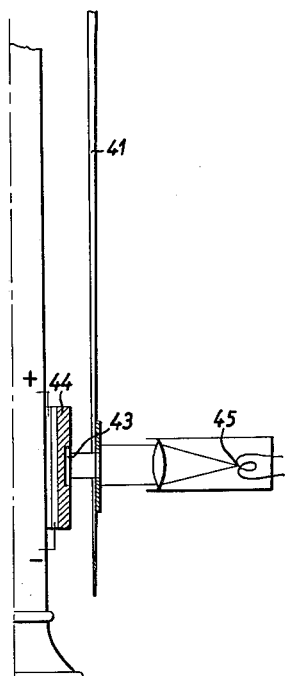
Fig. 4
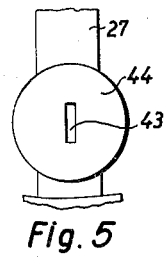
Fig. 5
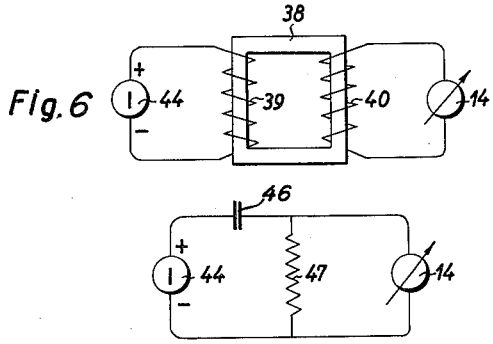
Fig. 6
Fig. 7
INVENTORS
FERENC PAULIK
JENO PAULIK
LASZLO ERDEY

United States Patent Office 3,045,472
Patented July 24, 1962

3,045,472
APPARATUS FOR SIMULTANEOUSLY CARRYING OUT THERMOGRAVIMETRIC, DIFFERENTIAL-THERMAL AND DERIVATIVE-THERMO-GRAVIMETRIC ANALYSIS
Ferenc Paulik, 7 Liptak Lajos-utca, Budapest IV, Hungary; Jenö Paulik, 29 Deak Ferenc-utca, Budapest IV, Hungary; and László Erdey, 16 Toldi Ferenc-utca, Budapest I, Hungary
Filed Dec. 3, 1957, Ser. No. 700,442
2 Claims. (Cl. 73—15)

The testing of materials for quality and quantity has been done for a long time by using the thermogravimetric (abbreviation TG) method of measuring. Testing is carried out by means of a thermobalance by heating a sample of the test material in a furnace at a chronologically steady increase in temperature and by measuring the furnace temperature and the change in weight of the material. The change in weight, represented in the functioning of the furnace temperature, gives the TG graph.

In many cases it is also necessary to test thermal processes of a type not connected with any change in weight but only with a change in heat content (e.g. recrystallisation). For a long time it has been customary to test these changes by using the differential-thermal analysing apparatus (abbreviation DTA). According to this method of measuring two thermoelements are respectively incorporated in the test sample and in an inert substance invariable during testing. By heating the two substances in an electric furnace at a fairly steadily increasing temperature, the difference in temperature appearing on the effect of the chemical and physical processes on the one hand, and the temperature of, for instance, the inert substance on the other, are measured by means of opposing thermoelements and the measuring instruments. By plotting the difference in temperature between the two substances depending on the temperature of the inert substance the DTA graph is obtained, which is just as characteristic of the individual chemical compounds as are the TG and DTG graphs.

To determine more precisely the characteristic temperature, the inventors previously worked out a new testing method, the so-called derivative-thermogravimetric (abbreviation DTG) method of measuring, and designed apparatus which, mounted on a balance, measures the speed of change in weight, thereby enabling an easier and more precise definition of the characteristic temperature values. By plotting the speed of weight change in the function of the furnace temperature the DTG graph is obtained.

Hitherto two or three different apparatuses had to be used to carry out the three different measuring methods described above. Only the combination of two of the first-named methods and one apparatus suitable for this have been recently suggested.

This invention provides a combination of all three types of measurement and uses for this purpose a common apparatus.

According to the invention, the new analysing apparatus comprises a combination of the following main parts: a crucible for the thermogravimetric and differential-thermal analysis of solid substances, secured on one arm of a thermobalance beam by means of an electrically insulating carrier member, to hold a sample of the test material; a stationary crucible to hold an inert comparison substance invariable during testing both crucibles being accommodated in a heating furnace; two thermo-elements in heat-absorbing connection with the test material and the inert substance respectively; a measuring instrument for derivative thermogravimetric analysis connected with the other arm of the thermobalance beam. With this apparatus the TG, DTA and DTG tests can be made on one single sample as test material and the change in weight, its speed and the heat content change of the sample can be plotted or evaluated corresponding to the temperature change. The test results can be plotted either by hand or mechanically.

The new apparatus has several advantages over those hitherto used. For instance, there is a great reduction in the time necessary for carrying out complete thermal testing of the test material. The curves can be found in the function of the change in temperature, whereas with previous apparatuses they could be ascertained only depending on the furnace temperature, the inert substance temperature or the time. As a result of this fact, the true temperature of the tested changes or reactions can be recognised. With this apparatus, melting or sintering substances or liquid substances capable of forming drops can be easily and quickly tested by using an appropriately constructed vessel or container for the sample. Various types of balance are suitable for carrying out measurements, individual parts being appropriately transformed according to the invention (lever, spring or torsion balances, e.g. Chevenard thermobalances). The invention will be more particularly described with reference to the attached drawings.

Figure 2:
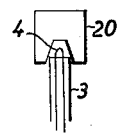
Figure 8:
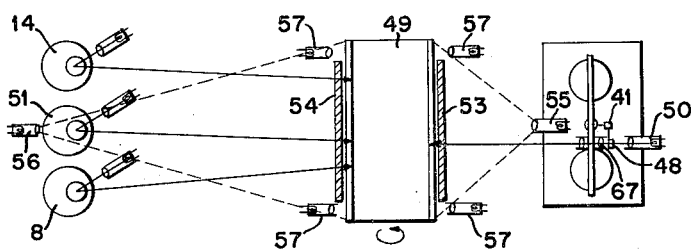

FIGURE 1 gives a diagrammatic view and a partial section of the whole apparatus;
FIGURE 2 shows details of a crucible;
FIGURES 3–5 show a modification for measuring deviation of the balance from a balanced position;
FIGURES 6 and 7 show circuit arrangements connected to the embodiment of FIGURES 3–5 to indicate the deviation of the balance; and
FIGURE 8 shows a further modification to automatically record various measurements.

An electrically insulating porcelain rod 3 having two longitudinal borings is secured on the steel hoop 10 of the balance pan 11 suspended from an arm of the balance beam 9. A cup-shaped platinum crucible 5 can be placed on the upper end of the rod 3. In each boring of the porcelain rod is threaded respectively a lead of the thermoelement 4 in such a way that the soldered joint of the thermoelement comes to rest in the center line of and outside the crucible. The insulating rod 3 is laid so as to be longitudinally movable in a boring of the carrier plate 19 for the heating furnace 1. A similar crucible is provided for the inert substance, whose carrier—also a porcelain rod 17 having two borings—is however secured in the carrier plate 19. The two borings hold the two leads of a second thermoelement. For uniform heating, the two crucibles 20 are best surrounded by a steel block 2 with two cavities open at the bottom.

The crucibles can be constructed in such a way that, as well as powdery substances, fusions or liquids can be tested which practically do not evaporate at testing temperatures. A crucible 20 constructed in this way (FIGURE 2) has a recess at the bottom and the soldered joint of the thermoelement is in the air space enclosed by the wall of the recess and the end of the rod 3. The thermoelement measures the temperature of this space, which according to experience changes strictly depending on the temperature of the sample.

As well as TG measurement, DTA measurement can also be carried out with the thermobalance described in a way known per se by means of a resistance 7 (FIGURE 1) interpolated between the poles of reciprocally operating thermoelements 4, 18, a millivoltmeter 6 for reading off the temperature, and a galvanometer 8.

The apparatus described is also suitable for simultaneously carrying out a DTG test when the following amplifications have been made. A permanent magnet 13 or an electromagnet is suspended on the (right-hand in FIGURE 1) arm of the thermobalance and surrounded by one or two suitably dimensioned and arranged windings 12 with a high number of turns.

In the winding a current is induced which is proportionate to the displacement of the magnet or the speed of the thermal weight change of the sample tested, the size of which can be measured by galvanometer 14. The readings of the galvanometer give a derivative of the TG curve, namely the DTG curve.

FIGURES 3–7 show a further construction of the measuring arrangement to find the DTG curve. Here a shutter with a wedge shaped opening 42 is secured on the balance pointer 41. Behind this shutter, which oscillates together with the needle pointer is a photocell or light element 44 with a vertical slit 43 in the centre. The photocell is illuminated by lamp 45, so that in this way a current in equal proportion to the balance reading is produced by photoelectric means. This current is conveyed to the primary winding 39 of a transformer 38, whereby a derivative of the primary current occurs in the secondary winding, which can be measured with the galvanometer 14. The transformer 38 can be replaced by a condenser 46 and resistance 47 (FIGURE 7) to produce a derivative of the photocell current which can be indicated on galvanometer 14.

The results of the TG, DTA and DTG measurements can be determined either by plotting the measuring values read off directly and representing them graphically, or plotting can take place automatically, the photographic way being the simplest. For this purpose a small mirror is secured on the balance beam and illuminated. The reflected light falls on a rotary drum having a paper roll sensitive to light. Alternatively, a small plate 48 with a slit is secured to the pointer 41 of the balance (FIGURE 8) and illuminated by a lamp 50. The image of the slit, if necessary enlarged by an optical system 67, appears on the light-sensitive paper strip which is secured to a rotary drum 49 driven by clockwork. The thermogram TG is plotted on the recording strip.

Automatic plotting of the weight change can be effected by photoelectric means (as in FIGURES 3–7). By using an optical slit 42 and a photocell or light element 44 a current in equal proportion to the balance reading can be produced, which is conveyed to a galvanometer. The spot of the galvanometer digresses in proportion to the balance reading.

The spots of galvanometers 14 and 8 for DTG and DTA respectively can be fixed either on opposite sides of a single photographic roll 49 (FIGURE 16) or possibly on different rolls. Thus the DTG and DTA curves are obtained. As photographic rolls of this type are normally driven by clockwork or an electromotor with constant rate of revolution, the curves could be fixed on the light-sensitive paper only in the function of the time, but here the problem of testing is to ascertain the temperatures at which the changes observed in the course of testing have taken place. To solve this problem, the invention provides the following steps.

To measure the temperature of the test material, the millivoltmeter 6 (FIGURE 1) must be replaced by a galvanometer 51 (FIGURE 16) and a third curve T must be plotted on the photographic paper by the spot of the galvanometer, as well as curves DTG and DTA. This third curve gives the changes in temperature. Furthermore a displaceable or rotary screen 53 or 54 is arranged in front of each slit cut out of the casing 52 of the photographic roll, these screens having transverse slits. When the screens are illuminated by lamps 55 and 56 and the drum is rotated, the light-sensitive paper can be ruled before or after testing. The distribution of the slits in the screen 53 for ruling the thermogram TG is even but must be brought into harmony with the sensitivity of the balance. The ruling for the thermogram DTG, DTA and T demands a distribution of the slits in the screen 54 which has been brought into harmony with the sensitivity of the thermoelement 4 or the galvanometer 51 for measuring the temperature.

In front of the two ends of the slits cut in the casing, altogether four lamps 57 are accommodated, operated by an instantaneous switch which is regulated in its turn by clockwork, so that the lamps light up for a few seconds every minute and plot a time scale on both sides of the light-sensitive paper.

On the paper developed after testing, the points of intersection of the temperature curve T and the calibration lines clearly denote the time at which the temperature of the sample reached the value corresponding to each temperature line. Straight lines should be drawn through these points of intersection in such a way that they connect every two associated time scales on both sides of the graph. By means of these points of time, the relevant temperatures can also be found and designated on the thermogram TG. In this way therefore the temperature division on both thermograms can be made with the necessary precision, so that the curves plotted according to time can be evaluated correctly according to temperature.

Instead of the photographic recording drum described, driven by a motor with constant rate of revolution, a recording device can be used in which the drums are driven or regulated by a current produced in the thermoelement and amplified in an electronic device. With a device such as this the DTA, DTG and TG curves can be plotted in the function not of the time but directly of the temperature.

The invention also covers a testing method in which the distillation test of liquids is effected by simultaneous measurement of the weight change of the liquid, the speed of the weight change and of the equilibrium temperature of the escaping vapours.

According to the method of the invention, testing can be carried out precisely with a hundredth or even a thousandth (about 1 to 0.1 g.) of the quantities of substance hitherto used (about 100 g.) for volumetric distillation measurements. For this reason it can be called a micro method.

The apparatus according to the invention can be made suitable for the distillation testing of liquids. A distillation device is accommodated in an electric furnace whose heating current must be regulated in such a way that the temperature of the air surrounding the evaporating vessel is in every case a few degrees C. lower than the temperature of the vapour space which is measured by the thermoelement. In this way overheating of the vapour can be avoided and it is not the temperature of the overheated vapour which is measured but the equilibrium vapor temperature of the liquid vapour phase. The measurement results can be found either by directly reading off the measuring instruments or by the automatic recording of the invention.

By this method the composition of liquid mixtures comprising several components can be ascertained in a similar way.

Having now particularly described and ascertained the nature of our invention and in what manner the same is to be performed, we declare that what we claim is:

1. An apparatus for simultaneously carrying out thermogravimetric, differential-thermal and derivative-thermogravimetric analysis of substances comprising in combination a first crucible secured on one arm of a thermobalance by means of an electrically insulating carrier member to hold a sample of the test material for thermogravimetric and differential-thermal analysis, a stationary crucible independent of said first crucible to hold an inert comparison substance invariable during testing, both crucibles being accommodated in a heating furnace, two thermoelements having joints each in indirect heat-absorbing connection with the test material and the inert substance respectively, the joints of the thermoelements arranged in a recess of the crucible so that they measure the temperature of the test material and the inert substance respectively through the wall of the crucibles, a temperature-measuring instrument connected to the thermoelement protruding into the test material, a second instrument to measure the difference between the temperatures of the test material and the inert substance, said second instrument connected to the thermoelements, and a device connected to the other arm of the thermobalance for derivative-thermogravimetric analysis comprising a magnet fixed to the other arm of the thermobalance, a winding arranged in the field of force of said magnet, and a meter for measuring the voltage induced in the winding.

2. An apparatus for simultaneously carrying out thermogravimetric, differential-thermal and derivative-thermogravimetric analysis of substances comprising in combination a first crucible secured on one arm of a thermobalance by means of an electrically insulating carrier member to hold a sample of the test material for thermogravimetric and differential-thermal analysis, a stationary crucible independent of said first crucible to hold an inert comparison substance invariable during testing, both crucibles arranged in a heating furnace, two thermoelements having joints each in indirect heat-absorbing connection with the test material and the inert substance respectively, the joints of the thermoelements being arranged in a recess of the crucible so that they measure the temperature of the test material and the inert substance respectively through the wall of the crucibles, a temperature-measuring instrument connected to the thermoelement protruding into the test material, a second instrument to measure the difference between the temperatures of the test material and the inert substance connected to the thermoelements, a device connected to the other arm of the thermobalance comprising a light shutter to pass a quantity of light in equal proportion to the respective balance reading, a photocell to perceive the quantity of light and to provide a current change therein, and means responsive to the current change to provide an indication of the first derivative thereof.

References Cited in the file of this patent
FOREIGN PATENTS 517,838    Belgium _____ Mar. 14, 1953

OTHER REFERENCES

Publications:

Nature, vol. 174, Nov. 6, 1954, pages 885–886. Article by Paulik, Paulik & Erdley. (Copy in Library U.S. Patent Office.)

Journal of Scientific Instruments, vol. 34, June 1957, pages 225–227. Article by Powell. (Copy in 73–15.)